Oct. 16, 1928.　　　　　　　　　　　　　　　　　　　　1,688,307
G. GALLIE ET AL
APPARATUS FOR REMOVING LARGE SIZED PARTICLES AND AGGREGATES
FROM CERTAIN FINELY DIVIDED POWDERS AND THE LIKE
Filed March 20, 1926
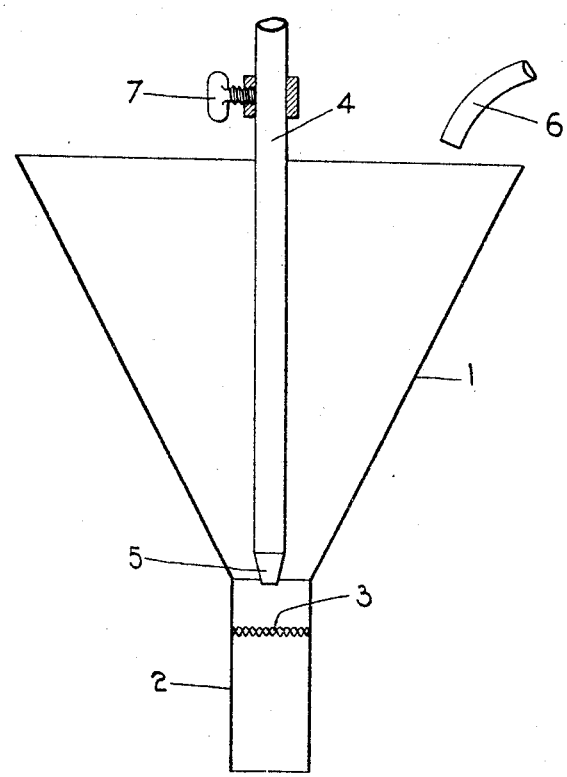
Inventors
George Gallie, and
Benjamin D. Parritt
by Herbert W. Jenner
Attorney.

Patented Oct. 16, 1928.

1,688,307

UNITED STATES PATENT OFFICE.

GEORGE GALLIE AND BENJAMIN DAWSON PORRITT, OF LONDON, ENGLAND, ASSIGNORS TO THE RESEARCH ASSOCIATION OF BRITISH RUBBER AND TYRE MANUFACTURERS, OF CROYDON, ENGLAND.

APPARATUS FOR REMOVING LARGE-SIZED PARTICLES AND AGGREGATES FROM CERTAIN FINELY-DIVIDED POWDERS AND THE LIKE.

Application filed March 20, 1926, Serial No. 96,330, and in Great Britain October 7, 1925.

This invention relates to a new or improved apparatus for removing large sized particles and aggregates from certain finely divided powders and the like.

It is well known that the presence of large sized particles, which may either consist of foreign matter introduced incidentally during or subsequent to the production of the powdered material or which may in certain cases be compact agglomerates of the powder, is composition as the bulk of the finely divided detrimental to the value of the finely divided powders used for a variety of purposes, such for example as for the manufacture of paints and rubber goods, and that it has been a practice in such cases to subject the powders in whole or in part to a sieving treatment to separate or detect any such deleterious constituents.

In carrying out such sieving processes or tests two difficulties have been encountered, one of which is the gradual clogging by the powder of the meshes of the sieve or the apertures of the screen with consequent reduction in the amount of material passing through, and the other is the fact that aggregates of particles are retained which under the normal conditions of employment of the powders and the like would be separated into their individual constituent particles.

It has therefore been found necessary in some instances to subject the material on the sieve or screen to a certain amount of mechanical pressure or rubbing to force it through the restricted openings of the sieve or screen and to prevent the clogging of these openings and to break down lumps or loose aggregates of powder. Hitherto however it has proved difficult to standarize the conditions and the amount and the degree of such mechanical treatment, and the danger has existed that such mechanical treatment might tend to damage or displace the filaments of which the sieve is constructed, thereby forming larger apertures permitting the passage of particles of greater size than is desirable or intended.

According to our invention the sieving of the powder or the like is carried out in water or some other liquid or mixture of liquids and the mechanical force necessary to break down lumps and, or, loose aggregates of particles and to prevent the clogging of the meshes of the sieve or the apertures of the screen is supplied by a jet or jets of water or some other liquid or mixture of liquids or steam or condensable vapour of a liquid or mixture of liquids impinging on the surface of the sieve or screen.

The shape and construction of the vessel in which the operation is conducted, and of the adjuncts thereof are such as to facilitate the aforesaid actions of the jet or jets.

In this manner it becomes possible to carry out the sieving operations under conditions susceptible of accurate standardization, which render it possible to break down loose aggregates or lumps of particles and to maintain the openings of the sieve or screen unaltered without the risk of damage or distortion in the filaments of the sieve.

The following example will serve to illustrate the application of our invention.

The form of finely divided carbon commonly known as "gas black" prepared by the incomplete combustion of natural gas, largely used in the manufacture of printing inks, gramophone records and rubber goods frequently contains relatively large particles of hard graphitic and other matter which are highly detrimental to the use of the "black" for such purposes, and it has been the custom to test samples for such grit by rubbing the product in a wet condition through a sieve of 80 meshes per linear inch.

This operation is not only dirty but occupies a considerable time, while the amount of the residue is appreciably influenced by the technique of the individual operator. By our invention in the treatment of the said powder it is possible to employ a sieve of 300 meshes per linear inch, and to complete the separation of the grit cleanly and quickly, under conditions which may be reproduced without difficulty.

The nature of the invention particularly as regards the character and function of apparatus such as may be employed in carrying the same into effect, will be clearly appreciated from a description that will now be given of experimental apparatus employed with entire success in the sieving of finely divided carbon known as "gas black".

The said apparatus which is diagrammatically illustrated in the accompanying drawing comprises a suitably dimensioned funnel 1 terminating in a cylindrical outlet 2 within which at the most advantageous position is arranged a sieve 3 of the desired fineness, say 300 meshes per linear inch, and a water delivery tube or conduit 4 extending axially within the funnel 1 and adjustable longitudinally therein, the inner end or mouth 5 of the said tube or conduit being so shaped as to deliver a stream preferably a spreading stream of water on to the sieve 3. In using such apparatus the funnel 1 is charged with gas black say until it is two-thirds full. Water is then gently delivered into the funnel, it may be through a small pipe 6 connected to a source of supply by means of a flexible connection, until the powder is well covered with water. Water under pressure is then fed into the axially arranged spraying pipe 4, and the said pipe is so adjusted that the stream of water plays on the sieve 3, with the result that not only is powder washed through the apertures, but there is caused in the cylindrical outlet 2 of the funnel above the sieve 3 an eddy or swirl of water and powder which tends to break up lumps or loose aggregates of the powder, and prevents clogging of the sieve openings. The powdered material is held in suspension in the liquid in the said funnel above the sieve, and is forced against the sieve, by the jet of fluid, as it gravitates into the space between the sieve and the end of the jet pipe 4. At the same time a moderately powerful ejector action is established in the said cylindrical outlet 2 by the stream of water from the axial spraying pipe 4, which action prevents the otherwise inevitable filling up and overflowing of the funnel. The position of the spraying end 5 of the water pipe relative to the sieve 3 calculated to give the best results can be readily determined by longitudinal adjustment of the water pipe, suitable means such as a clamping screw 7 being provided for holding it in the desired position after adjustment. If need be the water level of the contents of the funnel may be maintained by a stream of water from the supply pipe 6, and this also may be used to wash down any of the gas black which may have become attached to the sides of the funnel.

It will be understood that apparatus for effecting the improved sieving method on a commercial scale may vary in details of construction as found desirable without departure from the invention but the elements of the apparatus necessary and the arrangement and working of the same will be clear from the hereinbefore described example.

What we claim is:—

1. A separator for powdered material, comprising a funnel for the material, an outlet pipe depending vertically from the bottom of the funnel, a sieve for the material secured in the outlet pipe between its ends, and a jet pipe for fluid arranged in the funnel with its outlet end at the entrance to the outlet pipe, the orifice of the jet pipe being proportioned to deliver a relatively bulky and forcible jet upon the material being treated and operating to agitate the material and fluid in the upper part of the outlet pipe and to force the material through the sieve.

2. A separator for finely powdered material, comprising a receptacle for holding the material in suspension in liquid said receptacle having a cylindrical outlet within which is a sieve located intermediate of the ends of said outlet, and a jet pipe for fluid having its outlet arranged below the surface of the liquid in the said receptacle at a predetermined distance from the said sieve, the orifice of the jet pipe being proportioned to deliver a relatively bulky and forcible jet upon the material being treated.

3. A separator for finely powdered material, comprising a receptacle for holding the material in suspension in liquid said receptacle having a cylindrical outlet within which is a sieve located intermediate of the ends of said outlet, a jet pipe for fluid having its outlet arranged below the surface of the liquid in the said receptacle at a predetermined distance from the said sieve, the orifice of the jet pipe being proportioned to deliver a relatively bulky and forcible jet upon the material being treated, and a pipe for delivering water to said receptacle to maintain a constant level of liquid therein.

4. A separator for finely powdered material, comprising an open funnel, a cylindrical outlet pipe depending vertically from the bottom of said funnel, a jet pipe for fluid arranged in the funnel with its outlet end adjacent to the mouth of said outlet pipe, and a sieve secured in said outlet pipe at a predetermined distance from the ends thereof, the orifice of the jet pipe being proportioned to deliver a relatively bulky and forcible jet upon the material being treated.

In testimony whereof we affix our signatures.

GEORGE GALLIE.
BENJAMIN DAWSON PORRITT.